(12) United States Patent
Seger et al.

(10) Patent No.: US 7,942,255 B2
(45) Date of Patent: May 17, 2011

(54) TRANSPORT APPARATUS

(75) Inventors: Martin Seger, Neumarkt (DE); Stefan Heigl, Aholfing (DE)

(73) Assignee: Krones AG (DE)

( * ) Notice: Subject to any disclaimer, the term of this patent is extended or adjusted under 35 U.S.C. 154(b) by 152 days.

(21) Appl. No.: 12/304,107

(22) PCT Filed: Jun. 8, 2007

(86) PCT No.: PCT/EP2007/005092
§ 371 (c)(1),
(2), (4) Date: Mar. 26, 2009

(87) PCT Pub. No.: WO2007/141037
PCT Pub. Date: Dec. 13, 2007

(65) Prior Publication Data
US 2010/0200366 A1    Aug. 12, 2010

(30) Foreign Application Priority Data

Jun. 9, 2006 (DE) .......................... 10 2006 026 915
Jul. 21, 2006 (DE) .......................... 10 2006 034 283

(51) Int. Cl.
*B65G 47/26* (2006.01)
(52) U.S. Cl. ........................................ 198/452; 198/442
(58) Field of Classification Search .................. 198/442, 198/452, 461.2
See application file for complete search history.

(56) References Cited

U.S. PATENT DOCUMENTS

| | | | | |
|---|---|---|---|---|
| 2,980,229 A * | 4/1961 | Carter | ............................ | 198/442 |
| 3,279,580 A * | 10/1966 | Englander et al. | ............. | 198/452 |
| 3,552,537 A * | 1/1971 | Vamvakas | ..................... | 198/442 |
| 4,489,820 A * | 12/1984 | Schneider | ..................... | 198/448 |
| 4,496,040 A * | 1/1985 | Kronseder et al. | ............. | 198/434 |
| 6,206,174 B1 * | 3/2001 | Koltz | ............................ | 198/452 |
| 6,328,151 B1 * | 12/2001 | Spangenberg et al. | ........ | 198/452 |
| 7,073,656 B2 * | 7/2006 | Gust et al. | ..................... | 198/452 |

FOREIGN PATENT DOCUMENTS

| | | |
|---|---|---|
| DE | 3129389 | 2/1983 |
| DE | 3202991 | 8/1983 |
| DE | 3234286 | 4/1984 |
| DE | 94 07 313 | 7/1995 |
| EP | 0 218 002 | 4/1987 |
| NL | 7501573 | 8/1976 |
| WO | WO 98/17556 | 4/1998 |

\* cited by examiner

*Primary Examiner* — James R Bidwell
(74) *Attorney, Agent, or Firm* — Hayes Soloway P.C.

(57) ABSTRACT

A transport apparatus for the low-pressure transforming of a stream of containers into at least two separate single rows is provided. The apparatus has a multiple-lane feed conveyor, a plurality of single-lane discharge conveyors and an acceleration conveyor arranged between the feed conveyor and the discharge conveyors. A plurality of diagonally oriented guides are provided at a distance from one another across the acceleration conveyor, which guides a separated sub-stream of the stream of containers coming from the feed conveyor across the sections of the acceleration conveyor.

24 Claims, 3 Drawing Sheets

TRANSPORT APPARATUS

TECHNICAL FIELD

The invention relates to a transport apparatus for the low-pressure transforming of a multiple-row stream of bottles or the like into at least two separate single rows using a multiple-lane feed conveyor, a plurality discharge conveyors and an acceleration conveyor arranged therebetween. A plurality of diagonally oriented guides are provided at a distance from one another across the acceleration conveyor, which each guide a sub-stream of the stream of bottles coming from the feed conveyor across the sections of the acceleration conveyor.

DESCRIPTION OF RELATED ART

Transport apparatuses for the low-pressure transforming of a multiple-row stream of bottles, cans or other such containers into a single row by means of an acceleration conveyor and a guide running diagonally across the latter have long been known in different variants, wherein the acceleration conveyor is placed horizontally (DE 31 29 389 A1) or with a transverse inclination (DE 32 02 991 A1, DE 32 34 286 A1).

Such so-called "pressureless funnels" are used mainly in filling installations and packaging installations upstream of fast-running treatment machines which operate with a single row, such as e.g. filling machines or labelling machines. They have the task of funnelling the containers, which are transported between the treatment machines in a multiple-row stream at low speed, into a single row and at the same time accelerating them.

If the particular advantages of the pressureless funnels, such as a low-noise and fault-free mode of operation which is gentle on the containers and also a high throughput, are also to be achieved on processing machines which operate with multiple rows, such as e.g. packaging machines, then a separate pressureless funnel must be provided for each individual row or lane. The structural complexity of this is considerable.

In addition, it has also already been proposed to produce a double row using a conventional pressureless funnel with a single diagonal guide means through a specific control of the transport speeds, and then to split this double row into two single rows by means of a dividing railing (EP 938 440 B1). As a result, the structural complexity can be reduced compared to a double arrangement of two separate pressureless funnels. However, it has been found that gaps often occur in the two proceeding single rows, particularly in the single row furthest away from the diagonal guide means. These gaps lead to disruptions in the downstream treatment machine.

BRIEF SUMMARY

The object of the invention is to provide a transport apparatus in which a plurality of largely gap-free single rows can be formed using a single acceleration conveyor.

This object is achieved according to the invention by a transport apparatus for the low-pressure transforming of a stream of bottles or the like into at least two separate single rows, comprising a multiple-lane feed conveyor, at least two single-lane discharge conveyors, an acceleration conveyor arranged between the feed conveyor and the discharge conveyors, which acceleration conveyor comprises a plurality of sections having a speed which increases in the transport direction, and also a guide which runs diagonally across the intermediate conveyor, wherein at least one second guide which runs diagonally across the acceleration conveyor is arranged at a lateral distance from the first guide, and in that the guides in each case guide a sub-stream of the stream of bottles or the like coming from the feed conveyor across the sections of the common acceleration conveyor.

Advantageous further developments of the invention include assigning each single-lane discharge conveyor its own guide, where each guide merges continuously into a railing of the associated discharge conveyor. Each single-lane discharge conveyor may be assigned its own separate sub-section of the feed conveyor, and each guide may merge continuously into a railing or a dividing rail of the feed conveyor. Additionally, each sub-section of the feed conveyor may have its own drive motor which can be controlled by a monitoring device on the associated discharge conveyor, and each single-lane discharge conveyor may have its own drive motor which can be controlled by a monitoring device on a downstream conveyor.

At least one opening may be provided which makes it possible to discard horizontal bottles. The at least one opening is arranged in the end region of the acceleration conveyor and/or in the start region of a discharge conveyor. Alternatively, the opening is arranged in the region of the sub-stream, where the bottles already form a single row, preferably next to this single row. The opening has a cross section larger than a horizontal bottle and is formed between two or more aligned flat-top chains.

Advantageous further developments of the invention are specified in the dependent claims.

BRIEF DESCRIPTION OF THE SEVERAL VIEWS OF THE DRAWINGS

Two examples of embodiments of the invention will be described below with reference to the drawings, in which.

DETAILED DESCRIPTION

Figure 1:
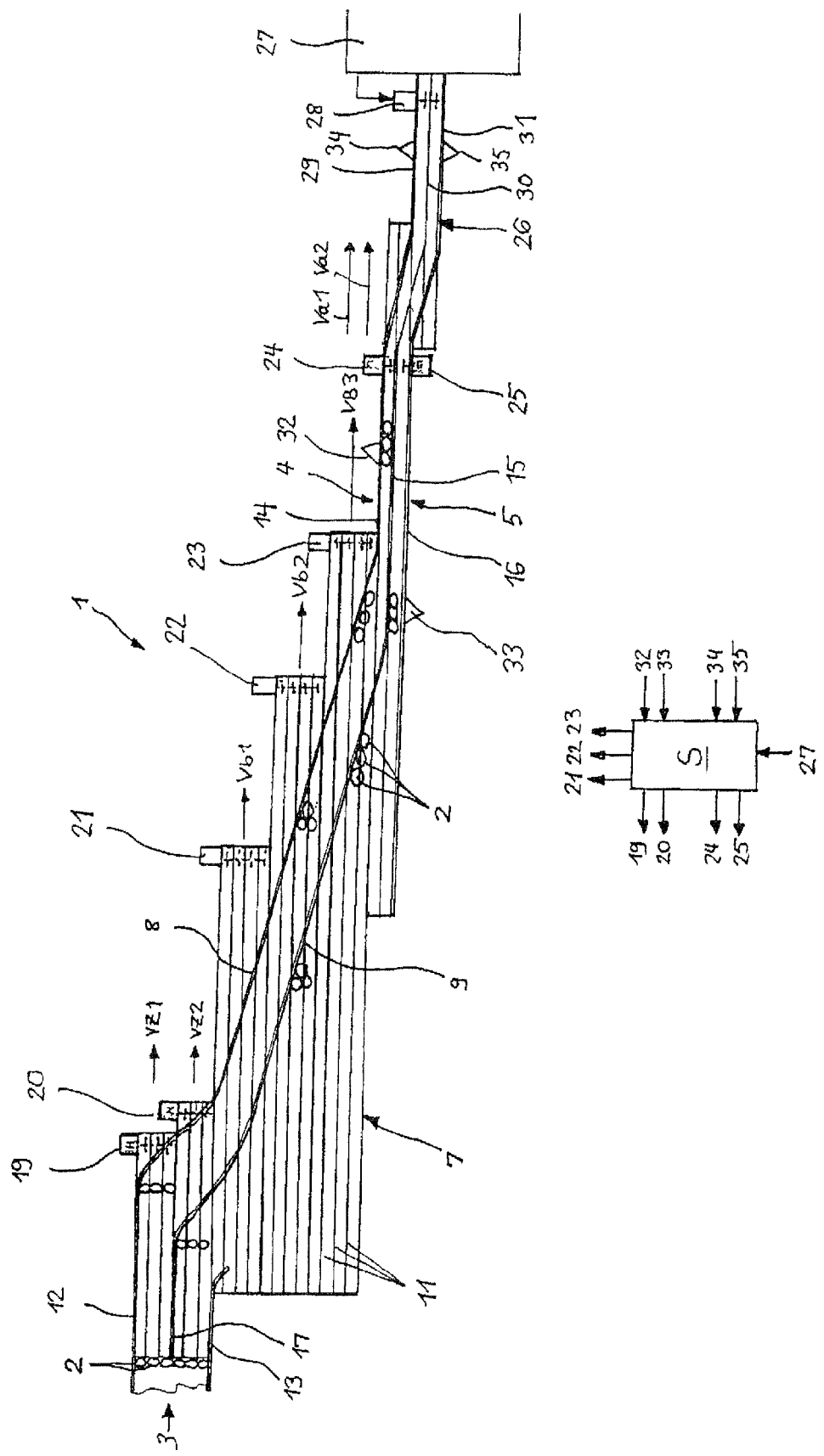
FIG. 1 shows a schematic plan view of a transport apparatus for producing two separate single rows.

The transport apparatus 1 for upright bottles 2 as shown in FIG. 1 comprises a multiple-lane feed conveyor 3, a multiple-lane acceleration conveyor 7 laterally adjoining it, and two discharge conveyors 4, 5 laterally adjoining the latter, all of said conveyors being constructed in the conventional manner from flat-top chains 11 acted upon by lubricant. Said flat-top chains are guided on a support frame (not shown).

The feed conveyor 3 comprises six flat-top chains, the acceleration conveyor 7 comprises a total of twelve flat-top chains and each discharge conveyor 4, 5 comprises one flat-top chain 11. All the flat-top chains 11 run parallel to one another and are arranged in a horizontal conveyor plane.

The feed conveyor 3 and the two discharge conveyors 4, 5 are in each case provided with side railings 12 to 16 for the bottles 2, wherein the railing 15 runs between the two discharge conveyors 4, 5 and belongs to both of these.

The left-hand railing 12 of the feed conveyor 3 as seen in the transport direction is adjoined by a curved guide 8 in the form of a guide rail, which initially runs diagonally across the entire feed conveyor 3, then diagonally across the entire acceleration conveyor 7 and finally merges into the left-hand railing 14 of the first discharge conveyor 4. The right-hand railing 13 of the feed conveyor 3 as seen in the transport direction ends freely in the start region of the acceleration conveyor 7.

A dividing rail 17 which is oriented parallel to the railings 12, 13 is provided centrally at least in the end region of the feed conveyor 3 and divides the six-lane bottle stream arriving at the feed conveyor 3 into two three-lane sub-streams. This dividing rail 17 is adjoined by a second curved guide 9 in the form of a guide rail, which initially runs diagonally across the right-hand sub-region of the feed conveyor 3, then diagonally across the entire acceleration conveyor 7 and the left-hand discharge conveyor 4 and finally merges into the common railing 15 of the two discharge conveyors 4, 5. The second guide 9 is arranged at a distance from and essentially parallel to the first guide 8. The two guides 8, 9 are fixed to a frame 18 (FIG. 2) which extends over the movement path of the bottles 2 on the acceleration conveyor 7, so that said bottles can move freely, guided only by the guides 8, 9.

The feed conveyor 3 has a first drive motor 19 for the three left-hand flat-top chains 11 and a second drive motor for the three right-hand flat-top chains 11. The dividing rail 17 runs precisely over the join between the equal-sized sections of the feed conveyor 3 thus formed. By means of the drive motors 19, 20, the two sub-sections of the feed conveyor 3 are driven independently of one another at a relatively slow speed Vz1 and Vz2 respectively.

The intermediate conveyor 7 has a first drive motor 21 for the four left-hand flat-top chains 11, a second drive motor 22 for the four middle flat-top chains 11 and a third drive motor 23 for the four right-hand flat-too chains 11. By means of the three drive motors 21, 22, 23, the total of twelve flat-top chains 11 of the acceleration conveyor 7 are driven in the transport direction, i.e. from left to right, at speeds Vb which increase in steps. Here, two or even more adjacent flat-top chains 11 may have the same transport speed and one or more of the flat-too chains 11 arranged on the right-hand side may run somewhat slower, as is generally customary in the case of pressureless funnels.

The transport speed of the outermost right-hand flat-top chain 11 is preferably approximately three times as high as the transport speed of the feed conveyor. The above-described speed ratio—like in the case of a rigid transmission—is retained even if the acceleration conveyor 7 runs faster or slower overall in order to adapt to the performance of the installation.

The left-hand discharge conveyor 4 has its own drive motor and the right-hand discharge conveyor 5 has its own drive motor 25. By means of the drive motors 24, 25, the two discharge conveyors 4, 5 are driven independently of one another at a relatively fast speed Va1 and Va2 which is approximately three times as high as the speed Vz1 or Vz2 of the feed conveyor 3.

The two single-lane discharge conveyors 4, 5 of the transport apparatus 1 are adjoined by the two-lane inlet conveyor 26 of a packaging machine 27, the two flat-top chains 11 of which are driven at the same speed in synchronism with the packaging machine 27 by a drive motor 28.

The inlet conveyor 26 has two side railings 29, 31 and also a central railing 30, which separates the two single rows from one another. The railings 14, 15, 16 and 29, 30, 31 merge into one another and form two separate lanes for the inlet to the packaging machine 27.

The three drive motors 21, 22, 23 of the acceleration conveyor 7 are driven by an electronic control device S at a predefined ratio to the drive motor 28 or to the packaging machine 27, in such a way that the optimal increases in speed are obtained at each power level in the region of the acceleration conveyor 7 where the bottles 2 in two identical sub-streams are funneled along the guides 8, 9 in a pressureless manner from three rows to one row and are accelerated.

The two drive motors 24, 25 of the discharge conveyors 4, 5 are likewise influenced by the control device S. To this end, the latter is connected to a monitoring device 34 on the left-hand lane and a monitoring device 35 on the right-hand lane of the inlet conveyor 26. If a monitoring device 34, 35 detects a gap in a row of bottles before the packaging machine 27, the speed of the associated drive motor 24, 25 is increased slightly compared to the speed of the inlet conveyor 26, until the row of bottles is again tightly closed up. The left-hand monitoring device 34 thus influences only the left-hand drive motor 24, while the right-hand monitoring device 35 accordingly controls only the right-hand drive motor 25. In this way, a gap-free loading of the packaging machine 27 with two rows of bottles is achieved at all times.

A monitoring device 32 on the left-hand discharge conveyor and a monitoring device 33 on the right-hand discharge conveyor 5 are also connected to the control device S. If a monitoring device 32, 33 detects a gap in the row of bottles, the speed of the associated drive motor 19 or 20 of the left-hand or right-hand sub-section of the feed conveyor 3 is temporarily increased slightly. The left-hand monitoring device 32 thus influences only the drive motor 19, while the right-hand monitoring device 33 accordingly controls only the drive motor 20. By virtue of this independent control of the two sub-streams, the latter are always loaded with the necessary number of bottles 2.

The monitoring devices 32 to 35 may be formed for example by light barriers, gap sensors, jam detectors, counting zones or the like. In any case, the above-described function of the control device S together with the packaging machine 27 as the lead machine ensures that the process is carried out with no disruption. The critical thing is that the bottles which arrive at the feed conveyor 3 already in two sub-streams or which are divided into two sub-streams by the dividing rail 17 pass through the common acceleration zone 7 without any mutual influencing and are able to form a single row against their "own" guide 8 or 9. The fact that the bottles 2 of the sub-streams pass through the faster sections of the acceleration conveyor 7 with a slight delay is not important.

Figure 2:
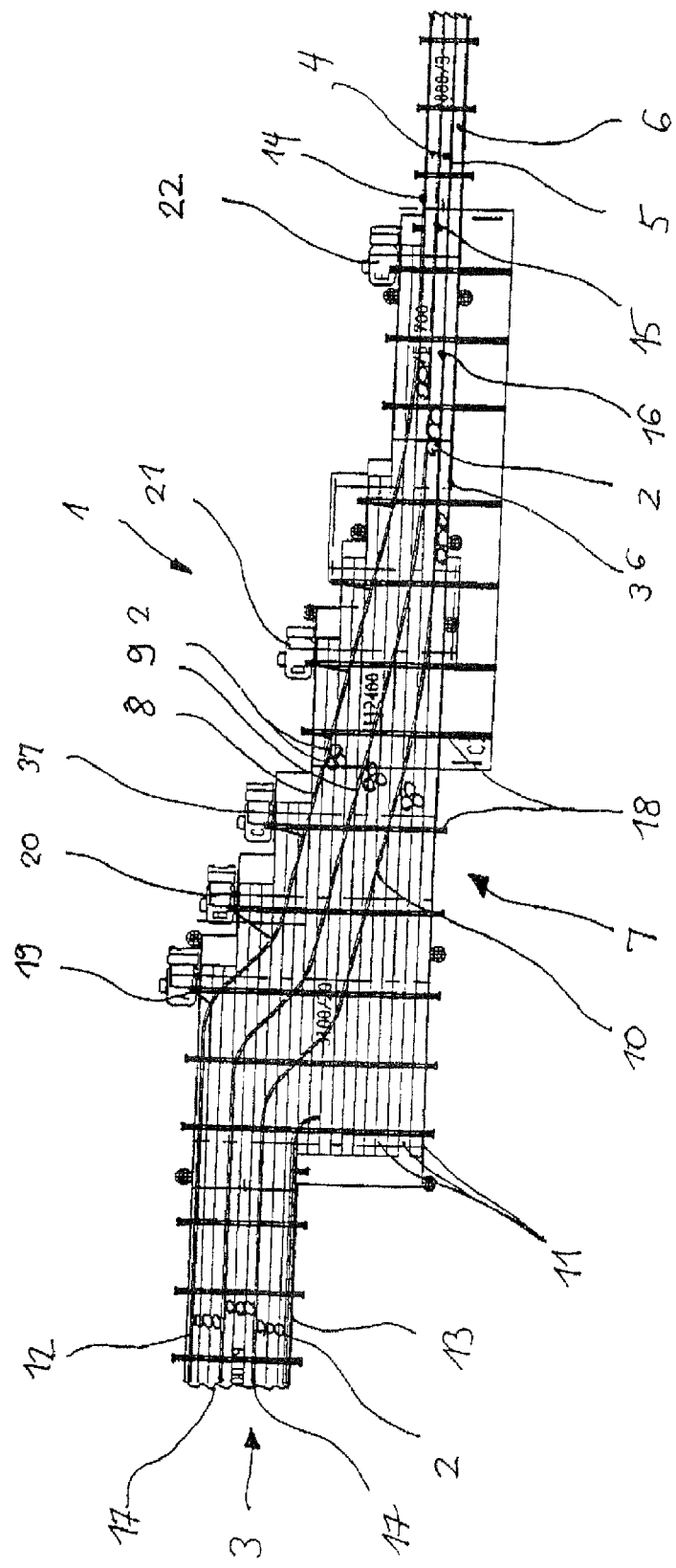
FIG. 2 shows a schematic plan view of a transport apparatus for producing three separate single rows.

The apparatus 1' shown in FIG. 2 differs from the apparatus 1 shown in FIG. 1 essentially in that here three guides 8, 9, 10 in the form of guide rails which are of identical orientation and run partially parallel to one another are fixed to the frame 18 on the acceleration conveyor 7 at a distance from one another. Accordingly, by means of two dividing rails 17, the bottles 2 on the feed conveyor 3 are supplied in three sub-streams of identical size, each having their own drive motor 19, 20, 37.

The acceleration conveyor 7 has here only two drive motors 21, 22, which drive via gear trains the total of eight flat-top chains 11 of the acceleration conveyor 7 at a speed which increases in the transport direction. The three drive motors of the three parallel discharge conveyors 4, 5 and 6 are not shown, and neither are the corresponding three monitoring devices.

With the above-described apparatus 1', three single rows can be produced in a pressureless manner and at high speed by means of a single acceleration conveyor 7, since here too the movement of the bottles of the sub-streams cannot mutually influence one another.

In the above-described examples of embodiments, the flat-top chains 11 of the acceleration conveyor 7 are arranged in a horizontal plane. However, it is also possible to arrange the conveyor plane of the acceleration conveyor 7 at a slight transverse upward or downward inclination relative to the discharge conveyors. In the first case, the arrangement of the guides 8, 9, 10 remains essentially unchanged, while in the second case the guides must be arranged on the other side of the respective sub-stream, i.e. on the right-hand side as seen in the transport direction, in order to support the bottles 2 on the downward side of the accelerating and tapering stream of bottles. These variants allow a particularly low noise level and make it possible to process problematic bottle shapes or the like. An arrangement of more than three guides on a single acceleration conveyor is also conceivable.

Figure 3:
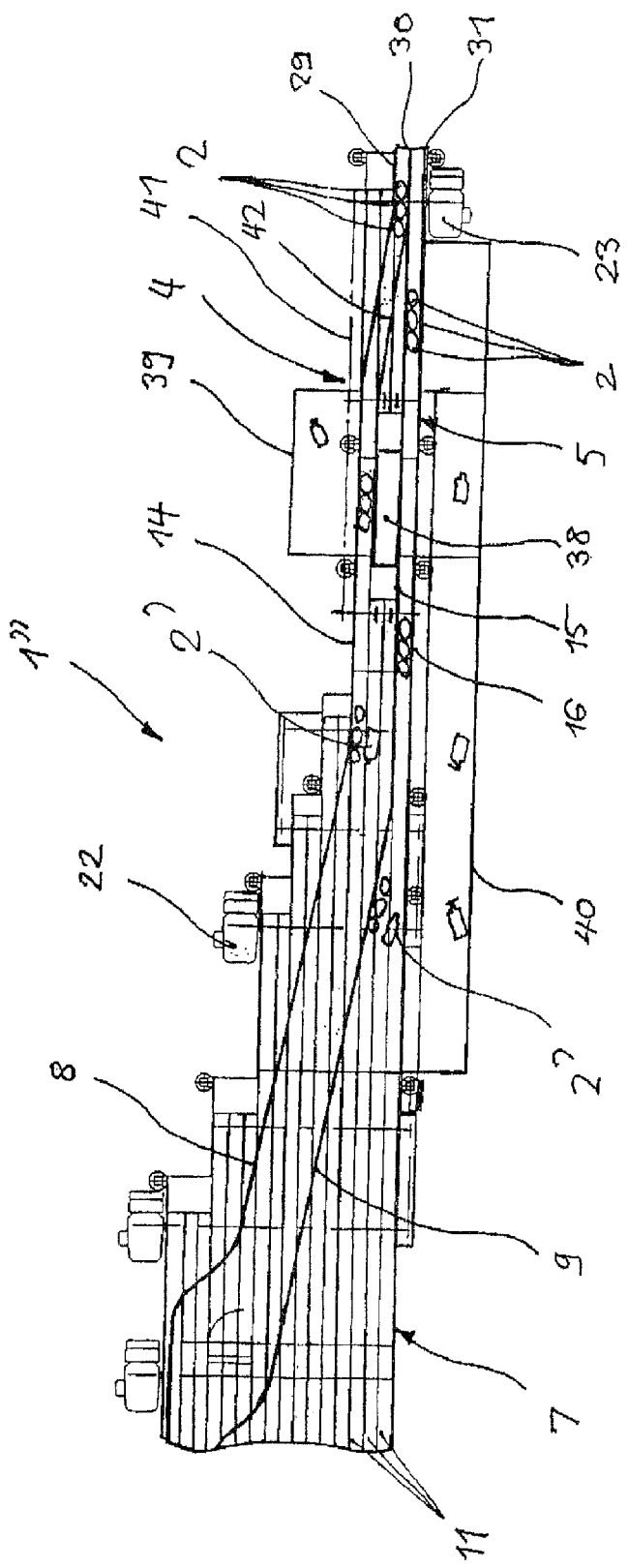
FIG. 3 shows a schematic plan view of the end region of a transport apparatus for producing two separate single rows with an integrated discarding horizontal bottles.

The transport apparatus 1" shown in FIG. 3 corresponds largely to the apparatus shown in FIG. 1. Only the differences will therefore be described below.

In the transport apparatus 1", the outer railing 16 at the edge of the acceleration conveyor 7 is arranged at a distance above the conveyor plane, said distance being somewhat larger than the diameter of the bottles 2. Horizontal bottles 2' of the right-hand sub-stream next to the guide 9 can therefore pass under the railing 16 into a collecting container 40 arranged next to the outermost flat-top chain 11.

For horizontal bottles 2' in the region of the left-hand sub-stream next to the guide 8, a dedicated opening 38 is provided which makes it possible to discard horizontal bottles 2'. A further collecting container 39 for horizontal bottles is arranged below this opening 38. The opening 38 is formed in the conveyor plane defined by the flat-top chains 11, in the end region of the acceleration conveyor 7 or in the start region of the discharge conveyor where the bottles 2 usually already form a single row. The opening 38 is located directly next to this single row, so that horizontal bottles 2' entrained next to the latter fall through the opening 38 into the collecting container 39. The opening 38 is much larger than the contour of a horizontal bottle 2'. This ensures that even bottles 2' which have toppled over are reliably discarded in the region of the left-hand sub-stream.

The opening 38 is formed by a gap between two aligned, adjacent flat-top chains 11 of the acceleration conveyor 7 or of the left-hand discharge conveyor 4. By means of a chain transmission 41, the aligned flat-top chains 11 are driven synchronously with one another at the desired speed via the motor 23. After the opening 38, an exact guidance of the single row is ensured by an additional railing piece 42.

The above-described transport apparatus 1" is particularly suitable for bottles 2 of low stability, such as e.g. slim PET bottles with petaloid bases, which under some circumstances may topple over when funneled along the guides 8, 9.

The invention claimed is:

1. A transport apparatus for a stream of containers comprising:
    a multiple-lane feed conveyor;
    at least two single-lane discharge conveyors;
    an acceleration conveyor arranged between the feed conveyor and the discharge conveyors, which acceleration conveyor comprises a plurality of sections having a speed which increases in the transport direction;
    a first guide which runs diagonally at least partially across the sections of the acceleration conveyor, for directing a first substream of the stream of containers;
    at least one second guide which is arranged at a lateral distance from the first guide and runs diagonally at least partially across the sections of the acceleration conveyor, and wherein the at least one second guide directs a second sub-stream of the stream of containers coming from the feed conveyor across the sections of the acceleration conveyor, and separates the first substream from the second substream as the stream of containers crosses the acceleration conveyor.

2. The transport apparatus according to claim 1, wherein each single-lane discharge conveyor is assigned its own guide.

3. The transport apparatus according to claim 2, wherein each guide merges continuously into a railing of the associated discharge conveyor.

4. The transport apparatus according to claim 1, wherein each single-lane discharge conveyor is assigned its own separate sub-section of the feed conveyor.

5. The transport apparatus according to claim 4, wherein each guide merges continuously into a railing or a dividing rail of the feed conveyor.

6. The transport apparatus according to claim 4, wherein each sub-section of the feed conveyor has its own drive motor which can be controlled by a monitoring device on the associated discharge conveyor.

7. The transport apparatus according to claim 1, wherein each single-lane discharge conveyor has its own drive motor which can be controlled by a monitoring device on a downstream conveyor.

8. The transport apparatus according to claim 1, further comprising at least one opening for discarding containers lying horizontally.

9. The transport apparatus according to claim 8, wherein the at least one opening is arranged at an end region of the acceleration conveyor and/or at a start region of a discharge conveyor.

10. The transport apparatus according to claim 8, wherein the opening is arranged in the region of the sub-stream, where the containers form a single row.

11. The transport apparatus according to claim 8, wherein the opening has a cross section larger than a horizontal container.

12. The transport apparatus according to claim 8, wherein the opening is formed between two or more aligned flat-top chains.

13. The transport apparatus according to claim 10, wherein the opening is arranged next to the single row.

14. A transport apparatus for a stream of containers comprising:
    a multiple-lane feed conveyor;
    at least two single-lane discharge conveyors;
    an acceleration conveyor arranged between the feed conveyor and the discharge conveyors, which acceleration conveyor comprises a plurality of sections having a speed which increases in the transport direction;
    a first guide which runs diagonally across sections of the acceleration conveyor;
    at least one second guide which runs diagonally across sections of the acceleration conveyor, arranged at a lateral distance from the first guide;
    wherein the guides in each case guide a sub-stream of the stream of containers coming from the feed conveyor across the sections of the common acceleration conveyor, said apparatus further comprising at least one opening for discarding containers lying horizontally;
    wherein at least one opening is arranged at an end region of the acceleration conveyor and/or at a start region of a discharge conveyor.

15. The transport apparatus according to claim 14, wherein the opening is arranged in the region of the sub-stream, where the containers form a single row.

16. The transport apparatus according to claim 14, wherein the opening has a cross section larger than a horizontal container.

17. The transport apparatus according to claim 14, wherein the opening is formed between two or more aligned flat-top chains.

18. The transport apparatus according to claim 14, wherein the opening is arranged next to the single row.

19. The transport apparatus according to claim 14, wherein each single-lane discharge conveyor is assigned its own guide.

20. The transport apparatus according to claim 19, wherein each guide merges continuously into a railing of the associated discharge conveyor.

21. The transport apparatus according to claim 14, wherein each single-lane discharge conveyor is assigned its own separate sub-section of the feed conveyor.

22. The transport apparatus according to claim 21, wherein each guide merges continuously into a railing or a dividing rail of the feed conveyor.

23. The transport apparatus according to claim 21, wherein each sub-section of the feed conveyor has its own drive motor which can be controlled by a monitoring device on the associated discharge conveyor.

24. The transport apparatus according to claim 14, wherein each single-lane discharge conveyor has its own drive motor which can be controlled by a monitoring device on a downstream conveyor.

* * * * *